United States Patent [19]

Kimura et al.

[11] 4,226,924
[45] Oct. 7, 1980

[54] THIN METAL-HALOGEN CELLS

[75] Inventors: Muneaki Kimura; Tatsumi Arakawa, both of Fuji, Japan; Masaru Ozaki, Drexel Hill, Pa.; Hidehiko Kobayashi, Fuji, Japan

[73] Assignee: Asahi Kasei Kogyo Kabushiki Kaisha, Osaka, Japan

[21] Appl. No.: 962,359

[22] Filed: Nov. 20, 1978

[30] Foreign Application Priority Data

| Nov. 22, 1977 | [JP] | Japan | 52/139419 |
| Nov. 24, 1977 | [JP] | Japan | 52/139835 |
| Jan. 24, 1978 | [JP] | Japan | 53/5826 |
| Mar. 10, 1978 | [JP] | Japan | 53/26671 |
| Mar. 10, 1978 | [JP] | Japan | 53/26672 |
| Jul. 4, 1978 | [JP] | Japan | 53/80520 |

[51] Int. Cl.² ............................. H01M 6/04
[52] U.S. Cl. .................. 429/126; 429/191; 429/219; 429/220
[58] Field of Search ............ 429/191, 218, 219, 220, 429/126

[56] References Cited

U.S. PATENT DOCUMENTS

| 2,762,858 | 9/1956 | Wood | 429/191 X |
| 3,558,357 | 1/1971 | Takahashi et al. | 429/191 |
| 3,565,694 | 2/1971 | Chireau | 429/218 X |
| 3,575,715 | 4/1971 | Masters et al. | 429/191 X |
| 3,653,968 | 4/1972 | Louzos | 429/219 X |
| 3,751,298 | 8/1973 | Senderoff | 429/191 X |
| 3,837,920 | 9/1974 | Liang et al. | 429/191 |
| 4,118,194 | 10/1978 | Raleigh et al. | 429/191 X |
| 4,118,549 | 10/1978 | Liang et al. | 429/191 |
| 4,127,708 | 11/1978 | Liang et al. | 429/191 |
| 4,147,842 | 4/1979 | Holmes et al. | 429/191 X |

*Primary Examiner*—Charles F. LeFevour
*Attorney, Agent, or Firm*—Sprung, Felfe, Horn, Lynch & Kramer

[57] ABSTRACT

A thin metal-halogen cell which comprises an electroconductive substrate, an anode active material layer of thin metal film formed on the base plate, a solid electrolyte layer formed on the anode active material, a cathode active material layer comprising a halogen, adhesive and carbonaceous powder, and an electroconductive plastic film, the latter two being laminated on the solid electrolyte layer in this order can be produced by using a step of forming thin films such as vacuum evaporation coating or sputtering and a step of laminating by using an adhesive. Thus, ultra-thin cells having high power and a thickness of 1 mm or less can be produced easily and inexpensively. When a separator and a barrier layer are sandwiched between the cathode active material layer and the solid electrolyte layer, shelf life of the cell is improved remarkably.

13 Claims, 4 Drawing Figures

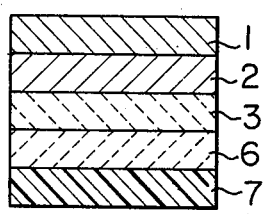
FIG. 1
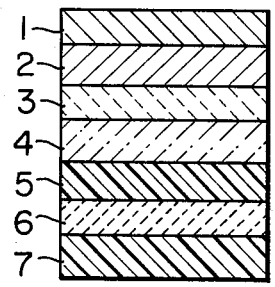
FIG. 2
FIG. 3
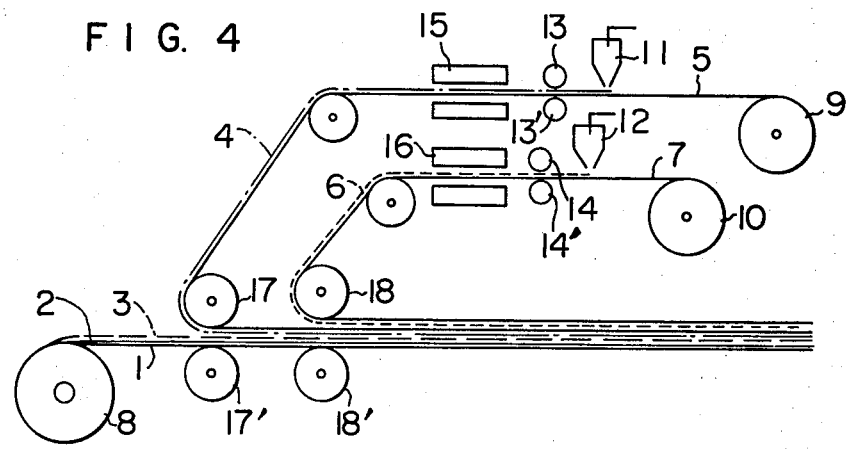
FIG. 4

THIN METAL-HALOGEN CELLS

BACKGROUND OF THE INVENTION

This invention relates to thin metal-halogen cells capable of supplying stably high power for a long period of time and a process for producing the same.

With recent development of thinning in electronic equipment in civilian uses such as small-sized computers, electronic watches, and the like, a demand for thinned batteries as power sources has been increased. In batteries using electrolyte solutions such as silver oxide batteries, lithium batteries, etc., since it is necessary to completely seal the electrolyte solution in a metal container in order to prevent the battery from leakage, the construction becomes complicated, and precision instruments and severe production management are necessary for the production of these batteries, which results in making it difficult to thin these batteries. On the other hand, thinned batteries using solid electrolytes have simple construction without anxiety of leakage. According to conventional thin metal-halogen cells having solid eletrolytes, the cells have laminated construction produced by piling a relatively large amount of electrolyte powder on a metal plate, which is an anode active material, and laminating with pressure molding a mixture of a cathode active material of a halogen and a collector of carbonaceous powder thereon. But these thin cells had many defects in that it was difficult to make the cells about 2 mm or less in thickness; there were limitations in form, such as in shape, size, and the like; and the active materials of both electrodes were easily exhausted by self-discharge in many cases, which resulted in shortening of shelf life of the cells.

In order to overcome these defects as mentioned above, the present inventors have studied eagerly on thin or ultra-thin cells and a process for producing the same and found that such thin or ultra-thin galvanic cells with novel form having a combination of an electrochemically active metal and a halogen can be produced by using technics of forming thin films of a metal as anode active material and a solid electrolyte and of laminating a cathode active material and an electroconductive plastic film thereon by using an adhesive, that is, thin or ultra-thin cells can easily be produced by a step of forming thin films such as vacuum evaporation coating or sputtering and a step of laminating by using an adhesive, and accomplished the present invention.

SUMMARY OF THE INVENTION

It is an object of the present invention to provide a thin or ultra-thin metal-halogen cell with novel form and excellent performance. It is another object of the present invention to provide a process for producing such a thin cell by using a vacuum evaporation coating or sputtering step and a laminating step using an adhesive. Further objects and advantages of the present invention will be apparent to one skilled in the art from the accompanying disclosure and discussion.

The present invention provides a thin metal-halogen cell which comprises an electroconductive substrate, an anode active material layer of thin metal film formed on the electroconductive substrate, a solid electrolyte layer formed on the thin metal film, a cathode active material layer comprising a halogen, an adhesive and carbonaceous powder, and an electroconductive plastic film, said cathode active material layer and the electroconductive plastic film being laminated on the solid electrolyte layer in this order.

The present invention also provides a thin metal-halogen cell further containing a separator or a barrier layer together with the separator between the solid electrolyte layer and the cathode active material layer in order to improve shelf life and performance of the cell.

Moreover, the present invention also provides a process for producing a thin metal-halogen cell which comprises a step of forming an anode active material layer of thin metal film on an electroconductive substrate by vacuum evaporation coating or sputtering, forming a solid electrolyte layer on the anode active material layer by vacuum evaporation coating or sputtering, and a step of laminating an electroconductive plastic film by using a mixture of cathode active material comprising a halogen, an adhesive and carbonaceous powder on the solid electrolyte layer.

In order to improve shelf life and performance of the thin metal-halogen cell, a separator or a barrier layer together with the separator can be sandwiched between the solid electrolyte layer and the cathode active material layer by a conventional method.

BRIEF DESCRIPTION OF DRAWINGS

FIG. 1 is a cross-sectional view of one example of the thin metal-halogen cell of the present invention containing no separator or barrier layer.

FIG. 2 is a cross-sectional view of one example of the thin metal-halogen cell containing both separator and barrier layers.

FIG. 3 is a separated cross-sectional view of the cell of FIG. 2 before laminated.

FIG. 4 is a schematic view of an apparatus used for producing the thin metal-halogen cell having a cross-sectional view as shown in FIG. 2.

DETAILED DESCRIPTION OF THE INVENTION

The thin metal-halogen cell of the present invention has the following advantages; that is, ultra-thin cells of 1 mm or less in thickness can easily be produced; flexible film-like thin cells can easily be produced, this is a novel feature heretofore being unknown; size, area or volume of thin cells can be selected freely; a user can cut out thin cells having optional shapes and sizes from a large sheet of the cell of the present invention; there can be obtained thin cells having a short-circuit current on the order of 1 mA/cm$^2$ or more, having excellent shelf life, and being capable of supplying stable power for a long period of time; thin cells having simple construction can easily be produced without using precision instruments under severe production management; thin cells can be produced in a large scale inexpensively, and the like.

The term "barrier" used in the present invention means a substance which interacts with the halogen molecules released from the cathode active material and which has such effects as suppressing rapid diffusion of the halogen molecules into the anode active material and relaxing the rapid reaction between the halogen molecules and the anode active material. By forming the barrier layer in the cell, self-discharge in the cell can be prevented and shelf life of the cell can be improved. It is preferable to place a separator between the barrier layer and the cathode active material layer so that the barrier does not directly contact with the cathode active material.

The thin metal-halogen cell of the present invention is explained below referring to the attached drawings.

In FIG. 1, numeral 1 denotes the electroconductive substrate, numeral 2 denotes the anode active material layer of thin metal film, numeral 3 denotes the solid electrolyte layer, numeral 6 denotes the cathode active material layer and numeral 7 denotes the electroconductive plastic film.

As the electroconductive substrate 1, there can be used a thin anti-corrosive metal plate such as a stainless steel plate of about 0.03 to 0.5 mm in thickness; Nesa glass (manufactured by Corning Glass Works); a high polymer such as poly(ethylene terephthalate) film on the surface of which an electroconductive material is formed by coating, vacuum evaporation coating or metallizing; an electroconductive plastic film, or the like. The use of soft ultra-thin electroconductive plastic film as the electroconductive substrate is particularly advantageous for producing flexible thin cells. The electroconductive plastic film means a polymer, in which carbonaceous powder such as active carbon, graphite, etc. is dispersed, molded into the form of film. As the polymer, that usually used as an electroconductive plastic binder can be used. Examples of the polymers are rubber series polymers such as polyisobutylene, styrene-butadiene rubber, acrylonitrile-butadiene rubber, and the like; cellulosic polymers such as ethyl cellulose, nitrocellulose, and the like; vinyl chloride-vinyl acetate copolymer, and the like. In order to maintain good electroconductivity, the proportion of the carbonances powder in the film is preferably in the range of 25 to 95% by weight, more preferably 50 to 80% by weight. Thickness of the film is preferably $20\mu$ to 1 mm, more preferably from $50\mu$ to 0.5 mm.

The anode active material layer 2 of thin metal film is formed on the electroconductive substrate 1 preferably by vacuum evaporation coating, sputtering or the like, preferably in 1 to $100\mu$ thick. As the metals, silver, copper, zinc, tin, lead, aluminum, bismuth, iron, titanium, manganese, nickel, cobalt, etc. can be used. A proper metal can be selected from them depending on the desired power voltage. In order to produce a cell having excellent shelf life, the use of silver is desirable.

The solid electrolyte layer 3 can prevent the cell from direct contact between the halogen molecule released from the cathode active material and the anode active material, inhibit internal short-circuit and increase the life of cell. As the solid electrolytes, there can be used metal halides, metal oxides, metal sulfides, and the like. Examples of these solid electrolytes are metal halides such as $AgI$, $AgBr$, $Ag_3SI$, $RbAg_4I_5$, $Ag_6I_4WO_4$, $Ag_{1.9}I_{15}P_2O_7$, $CuI$, $CuBr$, $CuBr_2$, $SnCl_2$, $SnBr_2$, $PbBr_2$, and the like; metal oxides such as $SnO_2$, $Al_2O_3$, $PbO$, $TiO_2$ and the like; metal sulfides such as $Ag_2S$, $CuS$, $PbS$, $NiS$, and the like.

The solid electrolyte layer 3 is formed on the anode active material layer 2 preferably by vacuum evaporation coating, sputtering or the like, preferably in 1 to $20\mu$ thick. If the thickness is less than $1\mu$, there is possibility in undesirable short-circuit, whereas if the thickness is more than $20\mu$, internal resistance increases due to excess thickness.

The cathode active material layer 6 contains a halogen as cathode active material, carbonaceous powder as a collector, and an adhesive. As the halogens which function as cathode active material, there can be used halogen elementary substances such as iodine, bromine, and the like; amides or imides of N-halocarboxylic acids such as N-bromosuccinimide, N-iodosuccinimide, N-bromoacetamide, and the like; hydrobromides of aromatic N-heterocyclic compounds such as pyridinium hydrobromide dibromide, trimethylenediamine dibromide, and the like; intermolecular compounds obtained from, for example, a tertiary amine and bromine, and the like.

In addition, inorganic halogen compounds known as cathode active material such as cuprous or cupric bromide, cuprous or cupric iodide, cesium iodide, lead chloride, and the like can also be used as the halogen. Among them, amides and imides of N- halocarboxylic acids are particularly preferable. The amount of the halogen to be used is preferably 0.1 to 10 moles per mole of the metal of the anode active material.

As the carbonaceous powder which lowers internal resistance of the cathode active material layer and functions as the collector, there can be used active carbon, graphite, acetylene black, and the like. The amount of the carbonaceous powder to be used is preferably 0.1 to 10 parts by weight per part by weight of the halogen.

As the adhesives which bonds the halogen and the carbonaceous powder, and which is added so as to bond the cathode active material layer 6 to the electroconductive plastic film 7 as explained hereinafter and to the solid electrolyte layer 3, on the other side, as metnioned above, or the separator 5 as mentioned below, there can be used any conventional adhesives. Among them, polymeric adhesives such as quaternary ammonium salt type electroconductive polymers, e.g. ECR-77 (trade mark, manufactured by Dow Chemical Co.), ECR-34 (polyvinyl benzyltrimethylammonium chloride aqueous solution, trade mark, manufactured by Dow Chemical Co.); polyvinyl chloride, polyvinyl acetate, polyacrylonitrile; cellulose type resins, e.g. nitrocellulose, ethyl cellulose, etc.; rubber type resins, e.g. styrene-butadiene copolymer, etc. are preferable, and particularly ECR-77 is more preferable.

The amount of the adhesive to be used is varied depending on the kind of the polymer used, but usually ranges from about 0.1 to 10 parts by weight per part by weight of the halogen.

The thickness of the cathode active material layer is influenced by a concentration of the halogen used. If a concentration of the halogen is about 30%, the thickness becomes about 0.3 mm. The thickness of the cathode active material layer ranges preferably from $10\mu$ to 2 mm, more preferably from $50\mu$ to 0.5 mm.

As the electroconductive plastic film 7, there can be used the same or different electroconductive plastic film as used as the electroconductive substrate 1 mentioned above.

In order to improve shelf life and performance of the cell, the separator or the barrier layer together with the separator can be sandwiched between the solid electrolyte layer and the cathode active material layer.

In FIG. 2, numeral 4 denotes the barrier layer and numeral 5 denotes the separator, and the other numerals are the same as in FIG. 1.

The separator 5 is used for inhibiting direct contact between the anode active material layer and the cathode active material layer and for suppressing internal short-circuit. As the separator, there can be used thin films such as porous polyethylene, porous polysulfone, porous polyacrylonitrile, cellophane, unwoven fabrics, and the like.

Thickness of the separator is preferably about 20–500μ. The separator can be treated by impregnation with glycerin, polyethylene glycol, and the like.

The barrier layer 4 is formed in order to improve shelf life of the cell. The barrier layer includes a halogen acceptor layer or a layer containing at least one metal compound.

The halogen acceptor layer is independent of the above-mentioned cathode active material layer including a halogen.

Since the halogen acceptor layer can suppress rapid diffusion of the halogen molecules into the anode by interaction with the halogen molecules released from the cathode active material, self-discharge of the cell can be prevented and thus shelf life of the cell can be improved. As the halogen acceptor, there can be used aromatic N-heterocyclic compounds such as pyridine, dipyridyl, quinoline, biquinoline, ortho-phenanthroline, pyrazine, and their derivatives and their hydrohalic acid salts, etc.; aromatic N-heterocyclic compounds containing other hetero atoms such as phenothiazine, methylene blue, etc.; tertiary amines such as quinuclidine, triethylenediamine, hexamethylenetetramine, triphenylamine, tetramethylphenylenediamine, etc.; cyclic ethers such as dioxane, trioxane, and their derivatives, etc.

As the barrier layer, a layer containing at least one metal compound may be also used in this invention. The metal compound included in said layer is independent of the solid electrolyte in the solid electrolyte layer 3. As the metal compound, it is preferable to use at least one salt of inorganic acid or at least one metal halide wherein the ionization tendency of the metal is larger than that of the metal in the anode active material. Examples of the salts of inorganic acids are alkali metal salts such as sodium, potassium, and the like, salts or alkaline earth metal salts such as calcium, magnesium, and the like salts of inorganic acids such as selenic acid, vanadic acid, orthovanadic acid, tungstic acid, telluric acid, and stannic acid, e.g. sodium selenate, sodium vanadate, sodium ortho-vanadate, sodium tungstate, sodium tellurate, sodium stannate, and the like.

Examples of metal halides wherein the ionization tendency of the metal is larger than that of the metal in the anode active material are zinc bromide, potassium bromide, calcium bromide, cobalt bromide, tin bromides, copper bromides, nickel bromide, magnesium bromide, rubidium bromide, zinc iodide, potassium iodide, cobalt iodide, tin iodides, copper iodides, nickel iodide, zinc chloride, potassium chloride, tin chlorides, copper chlorides, nickel chloride, magnesium chloride.

It is known that these metal halides by themselves can be used as a cathode active material when silver or zinc is used as an anode active material. In such a case, there is a tendency to lowering in power of the cell due to relatively weak oxidative power of the metal halide as the cathode active material. But in the thin metal-halogen cell according to the present invention, it becomes possible unexpectedly to prolong the life of the cell with increasing power output with high voltage and high current by using as a cathode active material a halogen simple substance, an intermolecular compound of halogen e.g. with a tertiary amine, or an organic halogen compound, having stronger oxidative power than the metal halides used as the barrier, and by forming a layer containing a metal halide wherein the metal has a larger ionization tendency than the metal of the anode active material between the cathode active material and the metal layer of anode active material.

The metal halide used in the barrier layer 4 can be selected optionally depending on the kind of a metal used as the anode active material. For example, when silver is used as the anode active material, there can be used a halide of potassium, calcium, zinc, cobalt, tin, copper, nickel, magnesium, rubidium, or the like; when tin is used as the anode active material, there can be used a halide of potassium, calcium, zinc, magnesium, or the like. In a combination of the metal halide used in the barrier layer and the halogen used as the cathode active material, it is preferable to use a halogen having relatively stronger acitivy as the cathode active material.

The amount of the halogen acceptor, the salt of inorganic acid, or the metal halide in which the metal has a larger ionization tendency than the metal used as the anode active material, to be used as the barrier is suitably 0.0001 to 1 mole per mole of the anode active material. Each compound used as the barrier can be used in a mixture with an adhesive such as ECR-77 (trade mark, Dow Chemical Co.) mentioned above and can be formed as a thin layer between the separator 5 and the solid electrolyte layer 3 by means of coating, and the like. If desired, a carrier such as fibrous film e.g. paper, unwoven fabrics, etc., porous film e.g. porous polyethylene film, etc. can be impregnated with the barrier and formed into the desired layer.

The thin metal-halogen cell having the above-mentioned construction according to the present invention can have any desired areas, and can easily have such an ultra-thin thickness as about 1 mm or less with flexible film form, and moreover can maintain high-power for a long period of time.

Processes for producing the thin metal-halogen cell of the present invention will be explained hereinafter.

The basic process of the present invention comprises a step of forming the thin metal layer of the anode active material on the electroconductive substrate by vacuum evaporation coating or sputtering, and forming the solid electrolyte layer on the anode active material layer by vacuum evaporation coating or sputtering, and a step of laminating the electroconductive plastic film on the solid electrolyte layer by using the adhesive containing a halogen as the cathode active material and the carbonaceous powder.

In order to improve the shelf life, a step of laminating the separator on the solid electrolyte layer, or a step of laminating the separator between the barrier layer and the cathode active material layer by using an electroconductive adhesive containing either the halogen acceptor, or the salt of inorganic acid, or the metal halide in which the metal has a larger ionization tendency than the metal of the anode active material can be added to the basic process of the present invention.

The processes of the present invention will be explained in detail referring to the attached drawings wherein the step of laminating the separator together with the barrier layer is included in the basic process.

FIG. 3(a) is a cross-sectional view of the electroconductive substrate 1, the thin metal layer of anode active material 2, and the solid electrolyte layer 3, each formed in this order by vacuum evaporation coating or sputtering under conventional conditions.

FIG. 3(b) is a cross-sectional view of the separator 5 and the barrier layer 4 which is formed by coating a mixture of a barrier and an electroconductive adhesive on the separator. The mixture in the form of a liquid or paste is coated on the separator 5 uniformly by means of a knife coater, roll coater, or the like. Subsequently the separator 5 having the mixture thereon is, if desired in the semi-dried state by using a dryer, laminated on the solid electrolyte layer 3 by compression under conventional conditions. In this case, the thickness of the layer 4 is preferably from about 0.01 to 1000μ. Needless to say, the mixture containing the adhesive and the barrier can be coated on the solid electrolyte layer 3 and then the separator 5 can be laminated thereon.

FIG. 3(c) is a cross-sectional view of the electroconductive plastic film 7 and the cathode active material layer 6 which is formed by coating a mixture in paste comprising a halogen compound, carbonaceous powder and an adhesive. Said paste-like mixture is coated on the electroconductive plastic film 7 uniformly by means of a knife coater, roll coater, or the like, and subsequently if desired in the semi-dried state by using a dryer, the film 7 having the mixture thereon is laminated on the separator 5, which has been or is to be simultaneously laminated on the solid electrolyte layer 3, by compression under conventional conditions. The thickness of the layer 6 is preferably from about 10μ to 2 mm, more preferably from 50μ to 0.5 mm.

Alternatively, after coating uniformly said paste-like mixture of the cathode active material on the separator 5, the electroconductive plastic film 7 can be laminated on said paste-like mixture, or after laminating the separator 5 on the electroconductive plastic film 7 using said paste-like mixture which is to form the layer 6 therebetween, the resulting laminate can be laminated on the solid electrolyte layer 3 by using a mixture of the barrier and an electroconductive adhesive therebetween.

The thin metal-halogen cell of the present invention obtained by laminating individual layers mentioned above followed by compression has a cross-sectional view as shown in FIG. 2, wherein the layers 4 and 6 adhere to the layers 3 and 5 stickily, respectively by using the adhesive. By the compression, internal resistance of the cell is reduced, which results in making the cell more thinner and increasing durability.

FIG. 4 shows one example of the procedure for continuous production of the thin metal-halogen cell of the present invention. In FIG. 4, the electroconductive substrate 1 which has been coated with the anode active material layer 2 and the solid electrolyte layer 3 by separate steps by means of vacuum evaporation coating or sputtering is supplied by a feed roller 8. On the separator 5 sent from a feed roller 9, a mixture containing the barrier and the electroconductive adhesive is fed from a nozzle 11 and is coated so as to form the barrier layer 4. The mixture containing the barrier and the electroconductive adhesive is spreaded on the separator 5 thinly and uniformly by means of metering rollers 13 and 13', and if desired, the spreaded mixture is dried by a drier 15 partly, and then laminated on the solid electrolyte layer 3 with compression by means of rollers 17 and 17'. Similarly, on the electroconductive plastic film 7 sent from a feed roller 10, a mixed paste containing the halogen compound, the carbonaceous powder and the adhesive is fed from a nozzle 12 and is coated so as to form the cathode active material layer 6. The coated mixed paste is spreaded on the electroconductive plastic film thinly and uniformly by means of metering rollers 14 and 14', and if desired, the spreaded mixed paste is dried by a drier 16 partly, and then laminated on the separator 5 with compression by means of rollers 18 and 18'.

As mentioned above, the present invention also provides processes for producing very thin cells having excellent performance with remarkably easy and unexpensively by employing the steps comprising a step of forming thin films by vacuum evaporation coating or sputtering, a step of coating by using adhesives, and a step of laminating with compression.

The present invention is illustrated more particularly by way of the following examples.

EXAMPLE 1

On an electroconductive plastic film of 0.28 mm in thickness made of polyisobutylene containing 75% by weight of carbon, a thin silver layer of 3.0μ in thickness was coated by vacuum evaporation coating under conventional conditions, followed by the vacuum evaporation coating of a silver bromide layer of 2.8μ in thickness under conventional conditions. On the other hand, on an electroconductive plastic film of 0.28 mm in thickness made of polyisobutylene containing 75% by weight of carbon, a quarternary ammonium salt type electroconductive polymer (ECR-77, trade mark, manufactured by Dow Chemical Co.) containing N-bromosuccinimide in a density of 7.2 mg/cm$^2$ on the support area of the plastic film and graphite in a density of about 2 mg/cm$^2$ on the support area of the plastic film was coated in about 60μ thick. Subsequently the thus treated electroconductive plastic film was laminated on the silver bromide layer and compressed.

The resulting thin cell had a thickness of about 0.6 mm, open-circuit voltage of 0.9 V, and a short-circuit current of 20 mA/cm$^2$. The cell showed about 80% of retention of short-circuit current after being allowed to stand for one month.

EXAMPLE 2

Using a stainless steel plate of 0.1 mm in thickness or Nesa glass (Corning Glass Works) of 2 mm in thickness having been coated with indium oxide as the electroconductive base plate in place of polyisobutylene containing carbon, individual thin cells were produced in the same manner as described in Example 1. These cells were inflexible but had excellent properties as cells as shown below.

TABLE 1

| Thin film-cell characteristics | Employed electroconductive substrate | |
| --- | --- | --- |
| | Stainless steel | Nesa glass |
| Thickness | 0.52 mm | 2.5 mm |
| Open-circuit voltage | 0.9 V | 0.9 V |
| Short-circuit current | 22 mA/cm$^2$ | 16 mA/cm$^2$ |
| Retention of short-circuit current after standing one month | about 82% | about 80% |

EXAMPLE 3

On a cellophane of 30μ in thickness used as a separator, a quaternary ammonium salt type electroconductive polymer (ECR-34, trade mark, manufactured by Dow Chemical Co.) containing 5% by weight of α,α'-dipyridyl was coated with a knife coater in about 2μ thick. The resulting cellophane was laminated on the same silver bromide layer (the solid electrolyte) as obtained in Example 1 so that the electroconductive polymer was sandwiched therebetween. Subsequently, the same electroconductive plastic film having the same cathode active material thereon as obtained in Example 1 was laminated on the cellophane so that the cathode active material was sandwiched therebetween.

The resulting thin cell had a thickness of about 0.7 mm, open circuit voltage of 0.90 V and a short-circuit current of 15 mA/cm$^2$. The cell showed 95% of retention of short-circuit current after being allowed to stand for one month.

EXAMPLE 4

On an electroconductive plastic film of 70μ in thickness made of a copolymer of vinyl chloride and vinyl acetate (vinyl chloride 80 wt %) containing 75% by weight of graphite, a mixed paste containing 30% by weight of N-bromosuccinimide, 10% by weight of graphite, and 60% by weight of a quaternary ammonium type electroconductive polymer (ECR-77) was coated uniformly with a density of 15 mg/cm$^2$ to form a cathode active material layer. A cellophane of 40μ in thickness as a separator was laminated on a cathode active material layer. On the cellophane, a ECR-77 solution containing 4.2% by weight of α,α'-dipyridyl was coated uniformly with a density of 7.5 mg/cm$^2$ to form a barrier layer. On the other hand, on an electroconductive plastic film of 70μ in thickness made of a copolymer of vinyl chloride and vinyl acetate (vinyl chloride 80% by weight) containing 75% by weight of graphite, a thin layer (2.5μ) of silver, tin or aluminum was coated by vacuum evaporation coating under conventional conditions, followed by the coating with a layer of silver bromide (2μ) by vacuum evaporation, stannous bromide (2μ) by vacuum evaporation or aluminum oxide (0.5μ) by sputtering, under conventional conditions. The barrier layer was laminated on the solid electrolyte layer thus produced to produce three kinds of cells having thickness of about 0.3 mm, that is, (A) Ag-AgBr-Br$_2$ cell, (B) Sn-SnBr$_2$-Br$_2$ cell, and (C) Al-Al$_2$O$_3$-Br$_2$ cell. Properties of these cells are as shown in Table 2.

TABLE 2

| Cell | (A) | (B) | (C) |
| --- | --- | --- | --- |
| Anode metal | Ag | Sn | Al |
| Open-circuit voltage (V) | 0.9 | 1.3 | 1.7 |
| Short-circuit current (mA/cm$^2$) | 15 | 50 | 130 |
| Retention of short-circuit current after one month (%) | 92 | 93 | 85 |
| Retention of short-circuit current after 3 months (%) | 91 | 84 | 80 |

EXAMPLE 5

In the Ag-AgBr-Br$_2$ series cell according to Example 4, (D) N-bromoacetamide, (E) pyridinium hydrobromide dibromide, or (F) copper bromide was used as a cathode active material in place of N-bromosuccinimide to produce three kinds of thin cells of Ag-AgBr-Br$_2$ series having thickness of about 0.3 mm in the same manner as described in Example 4. Properties of these cells are as shown in in Table 3.

TABLE 3

| Cell | (D) | (E) | (F) |
| --- | --- | --- | --- |
| Open-circuit voltage (V) | 0.90 | 0.88 | 0.60 |
| Short-circuit current (mA/cm$^2$) | 15 | 13 | 7 |
| Retention of short-circuit current after one month (%) | 88 | 90 | 90 |

EXAMPLE 6

In the Ag-AgBr-Br$_2$ series cell according to Example 4, (G) o-phenanthroline in an amount of 2% by weight, (H) triethylenediamine in an amount of 3% by weight or (I) trioxane in an amount of 2.5% by weight was used as a barrier in place of α,α'-dipyridyl in an amount of 4.2% by weight to produce three kinds of thin cells of Ag-AgBr-Br$_2$ series having thickness of about 0.3 mm in the same manner as described in Example 4. Properties of these cells are as shown in Table 4.

TABLE 4

| Cell | (G) | (H) | (I) |
| --- | --- | --- | --- |
| Open-circuit voltage (V) | 0.9 | 0.9 | 0.9 |
| Short-circuit current (mA/cm$^2$) | 15 | 15 | 15 |
| Retention of short-circuit current after one month (%) | 87 | 81 | 83 |

EXAMPLE 7

On an electroconductive plastic film of 0.28 mm in thickness made of 25% by weight of polyisobutylene and 75% by weight of graphite, a thin metal layer as anode as shown in Table 5 of 2μ in thickness was coated by vacuum evaporation coating under conventional conditions, followed by the vacuum evaporation coating of a metal bromide layer as solid electrolyte as shown in Table 5 of 2μ in thickness under conventional conditions. On the other hand, a mixed solution containing about 0.14 mole of an alkali metal salt or alkaline earth metal salt of inorganic acid as barrier as shown in Table 5 per mole of the anode metal and a quaternary ammonium type electroconductive polymer (ECR-77) was coated on a cellophane for packing commercially available (30μ thickness) in 2μ thick. The cellophane was laminated on the solid electrolyte layer so that the barrier layer was sandwiched therebetween. On the cellophane, a mixed paste containing 30% by weight of N-bromosuccinimide, 10% by weight of graphite and 60% by weight of an electroconductive polymer (ECR-77) was coated so that 1.4 moles of N-bromosuccinimide was present in the cathode active material layer per mole of the anode metal. An electroconductive plastic film of 0.28 mm in thickness made of 25% by weight of polyisobutylene and 75% by weight of graphite was provided as a collector on the cathode active material to produce a thin cell. Similarly, thin cells containing no metal salt of inorganic acid as barrier were also produced. Properties of these cells are as shown in Table 5.

As is clear from Table 5, the cells containing the barrier layer show better shelf life.

TABLE 5

| Run No. | Anode metal | Solid electrolyte | Barrier | Output after production | | | |
|---|---|---|---|---|---|---|---|
| | | | | After 1 day | | After 100 days | |
| | | | | Open-circuit voltage V | Short-circuit current mA/cm$^2$ | Open-circuit voltage V | Short-circuit current mA/cm$^2$ |
| 1 | Ag | AgBr | Na$_2$SeO$_4$ | 0.86 | 5.3 | 0.85 | 4.4 |
| 2 | Ag | AgBr | Na$_3$VO$_4$.H$_2$O | 0.86 | 5.0 | 0.85 | 4.2 |
| 3 | Ag | AgBr | NaVO$_3$ | 0.86 | 5.5 | 0.85 | 4.5 |
| 4 | Ag | AgBr | CaWO$_4$ | 0.86 | 4.9 | 0.85 | 4.0 |
| 5 | Ag | AgBr | K$_2$TeO$_4$.3H$_2$O | 0.86 | 5.2 | 0.85 | 4.2 |
| 6 | Ag | AgBr | Na$_2$SnO$_3$.3H$_2$O | 0.86 | 5.7 | 0.85 | 4.2 |
| 7 | Ag | AgBr | — | 0.87 | 5.2 | 0.80 | 1.2 |
| 8 | Sn | SnBr$_2$ | Na$_2$SeO$_4$ | 1.3 | 6.5 | 1.2 | 3.9 |
| 9 | Sn | SnBr$_2$ | — | 1.3 | 6.4 | 1.0 | 1.1 |
| 10 | Cu | CuBr$_2$ | Na$_2$SeO$_4$ | 1.0 | 3.9 | 0.9 | 2.7 |
| 11 | Cu | CuBr$_2$ | — | 1.0 | 4.3 | 0.7 | 0.9 |

EXAMPLE 8

On an electroconductive plastic film of 0.28 mm in thickness made of 75% by weight of graphite and 25% by weight of polyisobutylene, a silver layer of 2$\mu$ in thickness as coated by vacuum evaporation coating under conventional conditions, followed by the vacuum evaporation coating of a silver bromide layer of 2$\mu$ in thickness under conventional conditions. On the other hand, a mixed solution of 0.14 mole of a metal halide as a barrier as shown in Table 6 per mole of silver and a quaternary ammonium type electroconductive polymer (ECR-77) was coated on a cellophane for packing commercially available (30$\mu$ in thickness). The cellophane was laminated on the silver bromide layer so that the barrier layer was sandwiched therebetween. On the cellophane, a mixed paste containing 30% by weight of N-bromosuccinimide, 10% by weight of graphite and 60% by weight of an electroconductive polymer (ECR-77) was coated so that 1.2 moles of N-bromosuccinimide was present in the cathode active material layer per mole of silver. An electroconductive plastic film of 0.28 mm in thickness made of 25% by weight of polyisobutylene and 75% by weight of graphite was laminated on the cathode active material layer to produce a thin cell. Similarly, a thin cell containing no metal halide as a barrier was also produced. Properties of these cells are as shown in Table 6.

TABLE 6

| Run No. | Barrier Metal halide | Output after production | | | |
|---|---|---|---|---|---|
| | | After 1 day | | After 100 days | |
| | | Open-circuit voltage V | Short-circuit current mA/cm$^2$ | Open-circuit voltage V | Short-circuit current mA/cm$^2$ |
| 1 | KBr | 0.86 | 5.1 | 0.84 | 4.2 |
| 2 | CoBr$_2$.6H$_2$O | 0.86 | 5.8 | 0.86 | 4.6 |
| 3 | SnBr$_2$ | 0.88 | 5.2 | 0.87 | 4.3 |
| 4 | CuBr$_2$ | 0.88 | 5.9 | 0.86 | 4.6 |
| 5 | NiBr$_2$ | 0.85 | 5.8 | 0.85 | 4.8 |
| 6 | MgBr$_2$.6H$_2$O | 0.86 | 5.8 | 0.85 | 4.2 |
| 7 | RbBr | 0.86 | 5.5 | 0.85 | 4.3 |
| 8 | — | 0.87 | 5.2 | 0.80 | 1.2 |

EXAMPLE 9

Using the same procedure as described in Example 8 except for using tin as an anode active material in place of silver, tin bromide as a solid electrolyte in place of silver bromide and nickel bromide as the metal halide as the barrier, a thin cell was produced. The cell had open-circuit voltage of 1.3 V and short-circuit current of 9.7 mA/cm$^2$ after 1 day from the production and open-circuit voltage of 1.2 V and short-circuit current of 8.8 mA/cm$^2$ after 3 months from the production.

When a cell was produced in the same manner as mentioned above except for excluding the use of nickel bromide, it had open-circuit voltage of 1.3 V after 1 day from the production and that of 0.9 V after 3 months from the production.

What is claimed is:

1. A thin metal-halogen cell which comprises an electroconductive substrate about 50 microns to 0.5 mm in thickness, a metal film anode active material layer of about 1 to 100 microns formed on the substrate, a solid electrolyte layer of about 1 to 20 microns formed on the anode active material, a cathode active material layer of about 50 microns to 0.5 mm thickness and comprising a halogen, an adhesive and carbonaceous powder, and an electroconductive plastic film about 50 microns to 0.5 mm thick, the cathode active material layer and the electroconductive plastic film being laminated on the solid electrolytic layer in this order.

2. A thin metal-halogen cell according to claim 1, wherein the thickness of the cell is at most about 1 mm.

3. A thin metal-halogen cell according to claim 1, wherein the adhesive used in the cathode active material layer is a polymeric adhesive.

4. A thin metal-halogen cell according to claim 3, wherein the polymeric adhesive is a member selected from the group consisting of quaternary ammonium salt electroconductive polymers, polyvinyl chloride, polyvinyl acetate, polyacrylonitrile, cellulose resins and rubber resins.

5. A thin metal-halogen cell according to claim 1, 2 or 3, wherein the anode active material layer is a silver layer.

6. A thin metal-halogen cell according to claim 1, 2 or 3, wherein the anode active material layer is a layer of tin, aluminum or copper.

7. A thin metal-halogen cell according to claim 1, 5 or 6, which further contains an organic polymer separator about 20 to 500 microns thick between the cathode active material layer and the solid electrolyte layer.

8. A thin metal-halogen cell according to claim 7, wherein the separator is a member selected from the group consisting of a porous polyethylene, a porous polysulfone, a porous polyacrylonitrile, a cellophane, and an unwoven fabric.

9. A thin metal-halogen cell according to claim 1, 5 or 6, which further contains a separator about 20 to 500 microns thick and a barrier layer about 0.01 to 1000 microns thick between the cathode active material layer and the solid electrolyte layer.

10. A thin metal-halogen cell according to claim 9, wherein the barrier layer contains at least one organic compound selected from the group consisting of aromatic N-heterocyclic compounds, tertiary amines, and cyclic ethers.

11. A thin metal-halogen cell according to claim 9, wherein the barrier layer contains at least one alkali metal salt or alkaline earth metal salt of selenic acid, vanadic acid, ortho-vanadic acid, tungstic acid, telluric acid or stannic acid.

12. A thin metal-halogen cell according to claim 9, wherein the barrier layer contains at least one metal halide in which the metal has a larger ionization tendency than that in the anode active material.

13. A thin metal-halogen cell according to claim 9, wherein the barrier layer is made from a mixture of a barrier and an adhesive and has a thickness of from $0.01\mu$ to $1000\mu$.

* * * * *